(12) United States Patent
Stukalov

(10) Patent No.: US 10,515,464 B2
(45) Date of Patent: Dec. 24, 2019

(54) DYNAMIC COLOR CUSTOMIZATION OF STANDARDIZED (EMOJI) IMAGE CHARACTERS

(71) Applicant: WhatsApp Inc., Menlo Park, CA (US)

(72) Inventor: Dmitri Stukalov, Palo Alto, CA (US)

(73) Assignee: WhatsApp Inc., Menlo Park, CA (US)

( * ) Notice: Subject to any disclaimer, the term of this patent is extended or adjusted under 35 U.S.C. 154(b) by 0 days.

(21) Appl. No.: 15/698,598

(22) Filed: Sep. 7, 2017

(65) Prior Publication Data

US 2019/0073801 A1 Mar. 7, 2019

(51) Int. Cl.
*G06F 3/0484* (2013.01)
*G06T 11/00* (2006.01)
*H04L 12/58* (2006.01)
*G06T 11/60* (2006.01)

(52) U.S. Cl.
CPC ........ *G06T 11/001* (2013.01); *G06F 3/04845* (2013.01); *G06F 3/04847* (2013.01); *G06T 11/60* (2013.01); *H04L 51/10* (2013.01); *G06T 2200/24* (2013.01)

(58) Field of Classification Search
CPC ............ H04N 1/00212; H04N 1/00222; H04L 51/10; H04L 51/18; G06T 11/001; G06T 2200/24; G06F 3/0484; G06F 3/4845
See application file for complete search history.

(56) References Cited

U.S. PATENT DOCUMENTS

| | | | |
|---|---|---|---|
| 7,075,681 B1* | 7/2006 | Brothers | H04N 1/644 358/426.01 |
| 2017/0083174 A1* | 3/2017 | Tobens, III | G06F 3/0482 |
| 2018/0047195 A1* | 2/2018 | Vissicaro | G06T 11/60 |
| 2018/0081515 A1* | 3/2018 | Block | G06F 3/0484 |
| 2018/0107651 A1* | 4/2018 | Hamilton | G06F 17/2765 |

OTHER PUBLICATIONS

Internet Archive entry for "Garden Gnome Software: How to Chance the Colors of Scalable Vector Graphics." Aug. 24, 2016. https://web.archive.org/web/20160824062900/https://ggnome.com/wiki/How_to_Change_the_Colors_of_Scalable_Vector_Graphics. Date accessed Mar. 4, 2019 (Year: 2016).*

* cited by examiner

*Primary Examiner* — Antonio A Caschera
(74) *Attorney, Agent, or Firm* — Keller Jolley Preece

(57) ABSTRACT

One or more embodiments of the disclosure include a customized image character system that generates and provides customized image characters across computing devices. In particular, in one or more embodiments, the customized image character system provides a color modifier control as part of a messaging application for drafting digital messages with standardized image characters. The customized image character system can detect user selection of a standardized image character (e.g., an emoji image) and a new color (via the color modifier control) and dynamically generate a customized image character (e.g., a customized emoji image). The customized image character system can also send a digital message to a second client device such that the second client device displays the digital message with the customized image character.

20 Claims, 13 Drawing Sheets

DYNAMIC COLOR CUSTOMIZATION OF STANDARDIZED (EMOJI) IMAGE CHARACTERS

BACKGROUND

Recent years have seen rapid development in systems that enable individuals to digitally communicate with others. Indeed, as a result of proliferation in smartphones, tablets, laptops, computers, smart watches, smart televisions, and other computing devices, individuals have increased access to devices capable of sending and receiving information in relation to other individual users. Accordingly, developers have generated a variety of digital applications that allow clients to utilize computing devices to participate in various forms of digital communication.

For example, some conventional digital communication systems allow users to share digital messages that include standardized image characters, such as emoji. To illustrate, conventional digital communication systems can send digital messages with Unicode characters that allow users to convey messages via emoji rather than simple text. Although such conventional systems allow users to communicate utilizing standardized image characters, these systems have a number of shortcomings. For instance, although standardized image characters provide a more expressive means of communication than simple text, conventional emoji are standardized and rigid and provide little to no flexibility. Indeed, the nature of imposed standards, such as Unicode, on standardized image characters imposes a limited range of image characters with standardized features.

These and other problems exist with regard to conventional digital information systems for communicating and sharing digital messages with other users.

SUMMARY

One or more embodiments described below provide benefits and/or solve one or more of the foregoing or other problems in the art with systems and methods for generating and providing customized image characters from standardized image characters. In particular, in one or more embodiments, the disclosed systems and methods generate and send customized image characters between computing devices as part of digital messages. For instance, the disclosed systems and methods can provide a user interface as part of a messaging application that includes a color modifier control that allow users to dynamically modify the color of an emoji image. Moreover, the disclosed systems and methods can send digital messages that cause customized emoji images to be displayed at a recipient client device. Thus, the disclosed systems and methods can allow users to dynamically generate and utilize customized image characters in drafting and sending digital messages.

To illustrate, the disclosed systems and methods can provide a standardized image character (e.g., an emoji image) within a user interface of a messaging application of a client device. Moreover, the disclosed systems and methods can provide a color modifier control within the user interface of the messaging application. Based on user interaction with the color modifier control, the disclosed systems and methods can generate a customized image character (e.g., customized emoji image) that modifies one or more colors of the standardized image character. The disclosed systems and methods can then transmit an indicator of the customized image character to a second client device such that the second client device displays the customized standardized image character.

The disclosed systems and methods can utilize a variety of approaches to modify colors in standardized image characters and generate customized image characters. For instance, in one or more embodiments, the disclosed systems and methods identify color codes within the digital file of the standardized image character and modify the color codes based on a color selected by a user. Similarly, in one or more embodiments, the disclosed systems and methods generate and apply masks of different colors to generate customized image characters from standardized image characters. Thus, the customized image character system can use standardized image characters (e.g., Unicode identifiers or other standards) while still adding creativity and individuality through customized image characters.

The disclosed systems and methods can also quickly and efficiently transfer digital messages that include customized image characters between client devices. For instance, in one or more embodiments, the disclosed systems and methods send digital messages that include customized image characters, without having to transfer image files between computing devices. In this manner, the disclosed systems and methods can provide customized image characters without imposing additional processing and data transfer burdens on computing systems.

For example, the disclosed systems and methods can send a digital message that includes a standardized image character identifier together with a color indicator from a first client device to a second client device. The disclosed systems and methods can generate a customized image character at the second client device based on the standardized image character identifier and the color indicator. Specifically, the second client device can utilize the standardized image character identifier to determine a standardized image character stored on the second client device and then utilize the color indicator to generate the customized image character from the determined standardized image character. The disclosed systems and methods can thus provide the customized image character for display to the first client device and the second client device without having to transfer an underlying image file between the client devices.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

The detailed description is described in relation to the accompanying drawings in which.

DETAILED DESCRIPTION

Figure 1:
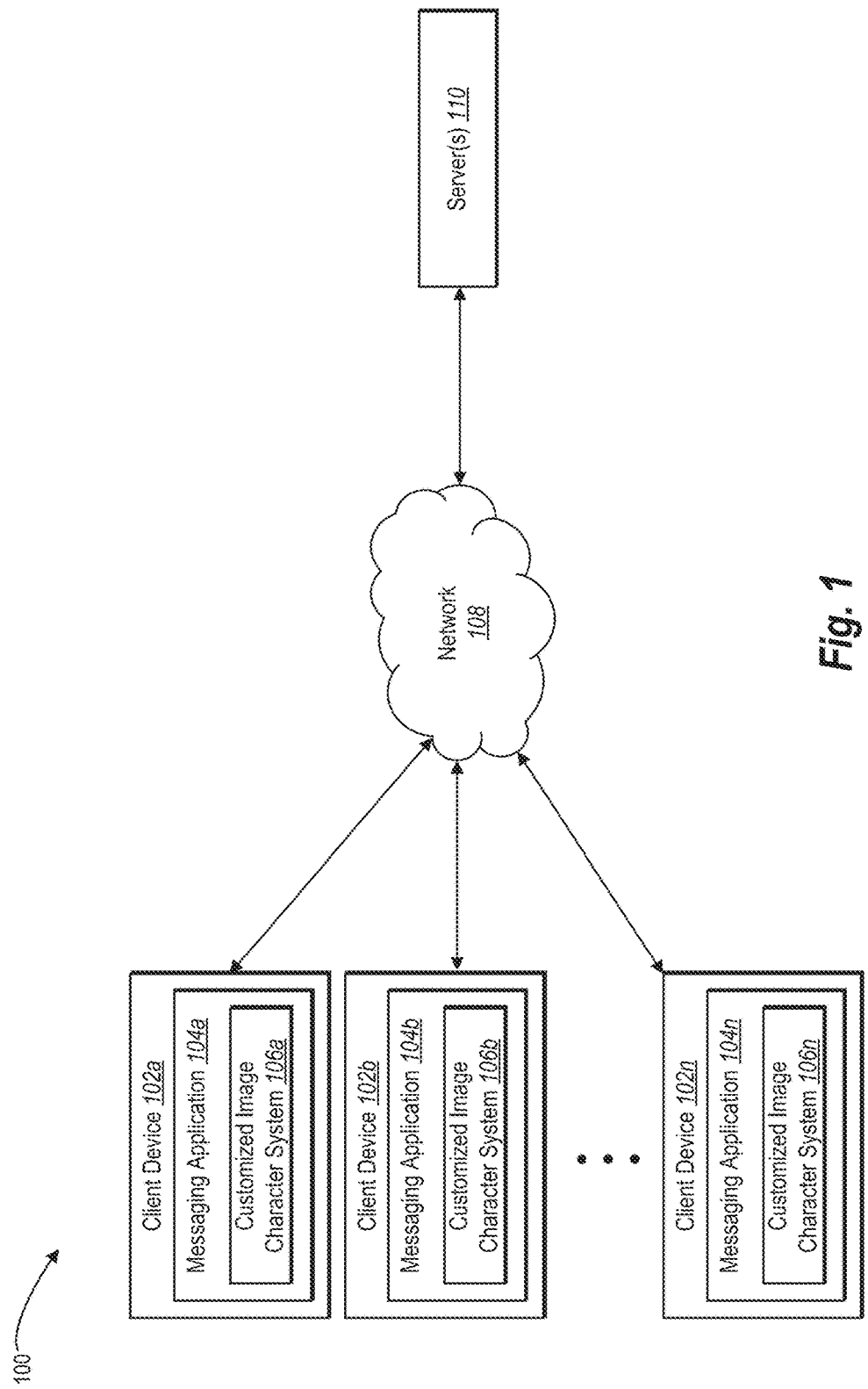
FIG. 1 illustrates a schematic diagram of a customized image character system in which the methods and systems disclosed herein may be implemented in accordance with one or more embodiments.

One or more embodiments of the present disclosure include a customized image character system that generates customized image characters from standardized image characters. In particular, in one or more embodiments, the customized image character system dynamically modifies standardized image characters based on user interaction with a color modification element to generate customized image characters. For example, the customized image character system can detect user selection of a new color from a color modification element and dynamically generate a customized image character with the new color. Moreover, the customized image character system can send a digital message comprising the customized image character such that receiving devices can display the customized image character as part of the digital message. The customized image character system thus enables users to customize standardized image characters and generate more unique and creative digital messages.

For example, in one or more embodiments, the customized image character system provides a standardized image character (e.g., an emoji image) for display via a user interface of a messaging application of a client device. Moreover, the customized image character system provides a color modifier control within the user interface. The customized image character system can receive a user selection of a new color via the color modifier control. In response to the user selection of the new color via the color modifier control, the customized image character system can generate a customized image character (e.g., a customized emoji image) by dynamically modifying the color of the standardized image character to the new color. Furthermore, the customized image character system can send an indicator of the customized emoji image as part of a digital message from the client device to a recipient client device such that the recipient client device generates and displays the customized image character as part of the digital message.

The customized image character system provides a variety of advantages over existing systems. For instance, by generating and providing customized image characters from standardized image characters, the customized image character system can provide users with additional flexibility in generating digital messages. Indeed, the customized image character system allows users to customize emoji images to provide more nuanced, entertaining, or emotive digital messages.

Furthermore, the customized image character system can also provide and transmit customized image characters in an efficient manner (i.e., without overburdening communications networks or applications that utilize the customized image character system). For example, in one or more embodiments, the customized image character system provides customized image characters by modifying standardized image characters already stored on a client device (e.g., by modifying emoji images). Indeed, rather than storing and transmitting an exorbitant number of different standardized image characters of different colors, the customized image character system can modify standardized image characters already stored on a client device. This allows the customized image character system to provide a wide variety of different customized image characters without drastically increasing computer storage or processing requirements.

For example, in one or more embodiments, the customized image character system generates customized image characters by modifying color codes or applying masks to existing standardized image characters. For instance, the customized image character system can identify color codes within a vector image file and generate a customized image character by modifying the color codes within the vector image file. Similarly, the customized image character system can identify pixels of a raster image file that correspond to a particular color and apply a mask having a new pixel in relation to the identified pixels.

The customized image character system can also transmit digital messages that comprise customized image characters efficiently and quickly. In particular, in one or more embodiments, the customized image character system transmits digital messages comprising customized image characters without transmitting the customized image character files (e.g., image files) themselves. Rather, the customized image character system can transfer a standardized image character identifier (such as a Unicode identifier) and a color indicator, which require very little data requirements relative to a file defining a customized image. A device receiving a digital message can analyze the digital message (with standardized image character identifier and color indicator) and efficiently generate a customized image character.

To illustrate, the customized image character system can utilize a standardized image character identifier to determine a standardized image character stored on the receiving device. Moreover, the customized image character system can then modify the standardized image character stored on the receiving device according to the color identifier to generate a customized image character. The customized image character system can then provide the customized image character for display as part of a digital message. Thus, the customized image character system provides an elegant solution that allows users to send digital messages that comprise customized image characters, without transmitting large customized image character files across communication networks and between client devices.

The present description utilizes a variety of terms to describe features of the customized image character system. For example, as used herein, the term "standardized image character" refers to a digital picture or pictorial symbol that is part of a standardized set of characters. For instance, the term "standardized image character" includes an "emoji image." As used herein, an "emoji image" includes a digital image or icon used to express an idea or emotion wherein the emoji image is defined by a standardized system for indexing characters across different operating systems. For example, the term "emoji image" includes a digital image(s) identifiable by the Unicode standard system (or another standardized system for indexing characters). Thus, an "emoji image" includes a digital image or icon used to express an idea, where the emoji image corresponds to a standardized image character identifier, such as a Unicode identifier.

As used herein, the term "customized image character" refers to a standardized image character that has been modified. Similarly, the term "customized emoji image" refers to an emoji image that has been modified. For example, a customized image character includes an emoji image where a color of the emoji image has been changed to a new color based on user input. To illustrate, a customized emoji image includes an emoji image stored on a computing device (and defined by a Unicode identifier) that has been modified by changing a color of the emoji image to a new color based on user input.

As used herein, the term "color modifier control" refers to a user interface element operable to select a color for a customized image character. In particular, a color modifier control can include a variety of user interface elements that a user can interact with to modify a color of a standardized image character. For example, a color modifier control can include a color slider where selection of a position along the color slider dynamically modifies a color of a standardized image character. Similarly, a color modifier control can include a circular color wheel, a scroll color wheel, a color scale, radio buttons, selectable icons, or other selectable elements of a user interface.

Additional detail will now be provided regarding the customized image character system in relation to illustrative figures. For example, FIG. 1 illustrates a schematic diagram of an example environment in which a customized image character system can operate in accordance with one or more embodiments. As shown in FIG. 1, the environment 100 can include one or more client devices 102a, 102b, . . . 102n, a network 108, and server(s) 110. The client devices 102a-102n, the network 108, and the server(s) 110 can operate in isolation or in combination to generate and provide customized image characters. In particular, the customized image character system can generate customized image characters from standardized image characters and provide the customized image characters with digital messages sent between the client devices 102a-102n.

As illustrated in FIG. 1, the environment 100 may include client devices 102a-102n. The client devices 102a-102n may comprise a variety of computing device, such as personal computers, laptop computers, tablets, or smartphones. For instance, in one or more embodiments, one or more of the client devices 102a-102n comprise one or more computing devices described below in relation to FIG. 10.

As shown, the client devices 102a-102n can include corresponding messaging applications 104a-104n. As used herein the term "messaging application" refers to an executable program for transmitting digital messages between at least two computing devices. For example, a messaging application includes an executable program for sending and receiving one or more of instant messages, multimedia messages, video messages, text messages, etc. Accordingly, in relation to FIG. 1, the messaging applications 104a-104n can send and receive digital messages for the client devices 102a-102n. For example, the messaging applications 104a-104n can comprise applications for sending and receiving messages between the client devices 102a-102n.

In addition, as shown in FIG. 1, the client devices 102a-102n may also include corresponding customized image character systems 106a-106n. The customized image character systems 106a-106n can generate customized image characters based on one or more standardized image characters. For example, as described in greater detail below, the customized image character systems 106a-106n can generate customized image characters with colors selected by users of the client devices 102a-102n.

As shown in FIG. 1, the environment 100 may also include the network 108. The network 108 may be any suitable network over which the computing devices can communicate. For example, the messaging applications 104a-104n can utilize the network 108 to transmit digital messages between the client devices 102a-102n via the server(s) 110, cell towers, or other types of routers. Example networks are discussed in more detail below with regard to FIG. 10.

Moreover, as shown in FIG. 1, the enviornment 100 may also include the server(s) 110. The server(s) 110 may generate, store, receive, and transmit any type of data including digital messages, standardized image characters, or customized image characters. For example, the server(s) 110 may transmit data to a client device, such as the client device 102a. The server(s) 110 can also transmit electronic messages between one or more the client devices 102a-102n. In one example embodiment, the server(s) 110 comprise a content server. The server(s) 110 can also comprise a communication server or a web-hosting server. Additional details regarding the server(s) 110 will be discussed below with respect to FIG. 10.

As mentioned, the customized image character system can utilize the client devices 102a-102n, the network 108, and the server(s) 110 in isolation or in conjunction to generate and provide customized image characters. By way of example, in one or more embodiments, the client device 102a receives user selection of a standardized image character in conjunction with generating a draft digital message. In response to selection of the standardized image character, the customized image character system 106a provides the standardized image character for display. Moreover, the customized image character system 106a provides a color modifier control. Furthermore, the customized image character system 106a detects user selection of a new color via the color modifier control.

In response to selection of the new color, the customized image character system 106a generates a customized image character. In particular, the customized image character system 106a modifies the selected standardized image character and generates the customized image character by replacing an existing color with the new color selected by the user via the color modifier control. The customized image character system 106a then provides the customized image character for display as part of the draft digital message via the client device 102a.

Furthermore, the customized image character system 106a can also transmit a digital message comprising a customized image character. For instance, the client device 102a can transmit a digital message with an indicator of the customized image character to the server(s) 110. Specifically, the client device 102a can transfer the digital message with a standardized image character identifier together with a color indicator.

The server(s) 110 can receive the digital message and transmit the digital message to one or more client devices.

For instance, the server(s) 110 receive the digital message (including the standardized image character identifier and color indicator) from the client device 102a and send the digital message (and the standardized image character identifier and color indicator) to the client device 102b. Upon receiving the digital message, the client device 102b can utilize the standardized image character identifier to determine a standardized image character. Moreover, the customized image character system 106b can utilize the color identifier to modify the standardized image character and generate the customized image character. The client device 102b can then display the digital message with the customized image character.

Accordingly, the customized image character system 106b can generate and provide customized image characters. Moreover, the customized image character system can provide users of the client devices 102a-102n with the ability to dynamically modify standardized image characters and share the customized image characters across client devices.

In one or more embodiments, the server(s) 110 can include all, or a portion of, the customized image character systems shown on the client devices in FIG. 1. In particular, the customized image character system can comprise an application running on the server(s) 110 or a portion of a software application that can be downloaded from the server(s) 110. For example, the customized image character system can include a web hosting application that allows the client devices 102a-102n to interact with content hosted at the server(s) 110. To illustrate, in one or more embodiments of the exemplary environment 100, one or more client devices 102a-102n can access a webpage supported by the server(s) 110. In particular, the client device 102a can run an application to allow a user to access, view, and/or interact with a webpage or website hosted at the server(s) 110.

Although FIG. 1 illustrates a particular arrangement of the client devices 102a-102n, the network 108, and the server(s) 110, various additional arrangements are possible. For example, while FIG. 1 illustrates multiple separate client devices 102a-102n communicating with the server(s) 110 via the network 108, in one or more embodiments a single client device may communicate directly with the server(s) 110, bypassing the network 108. Additionally, the customized image character system may be implemented in whole by the client devices or may be implemented in whole by the server(s) 110. Alternatively, the customized image character system may be implemented across multiple devices or components (e.g., utilizing the client devices 102a-102n and the server(s) 110).

Figure 2A:
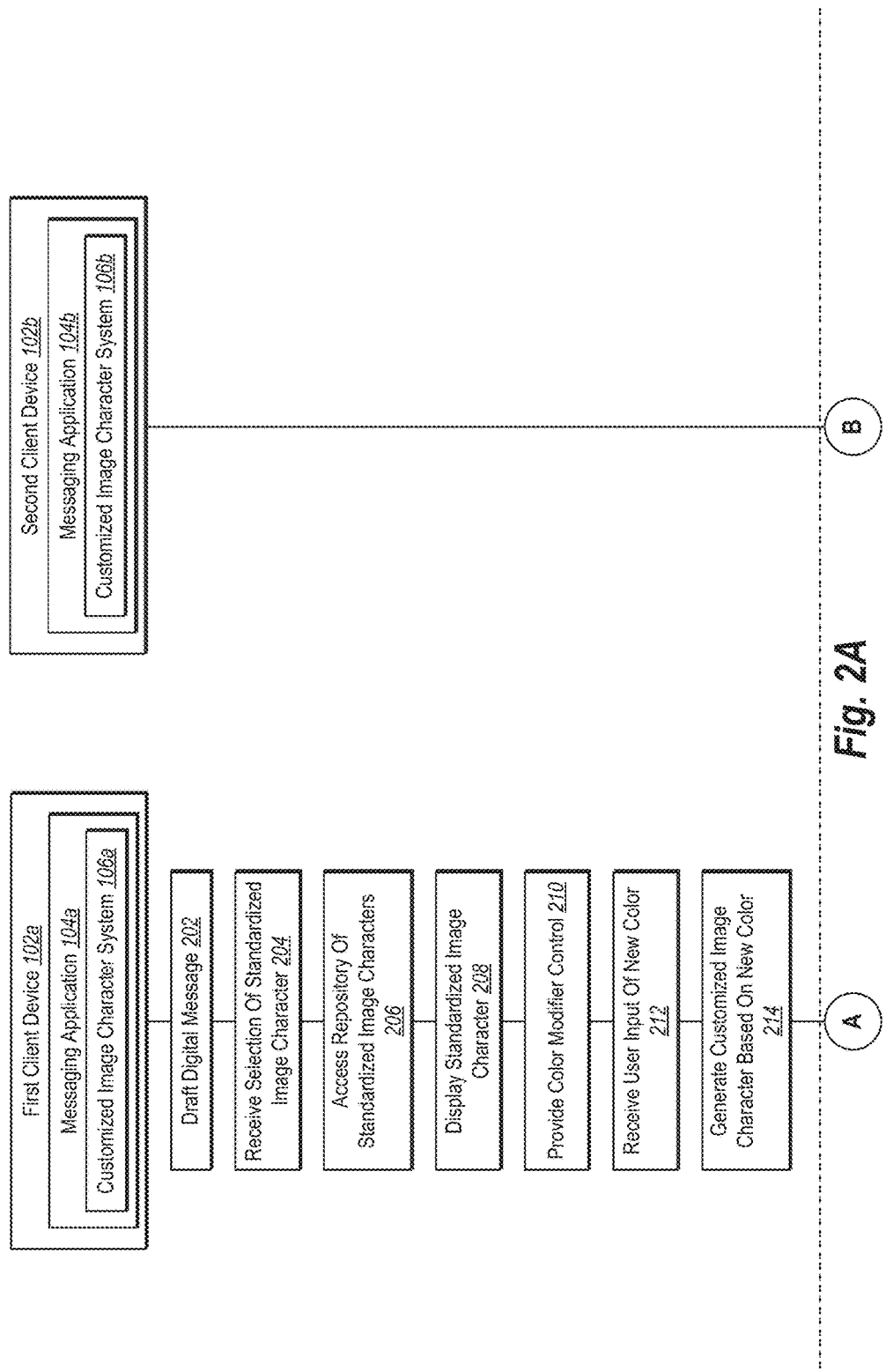
FIGS. 2A-2B illustrate a sequence diagram of a plurality of acts in a method of providing customized image characters in accordance with one or more embodiments.
Figure 2B:
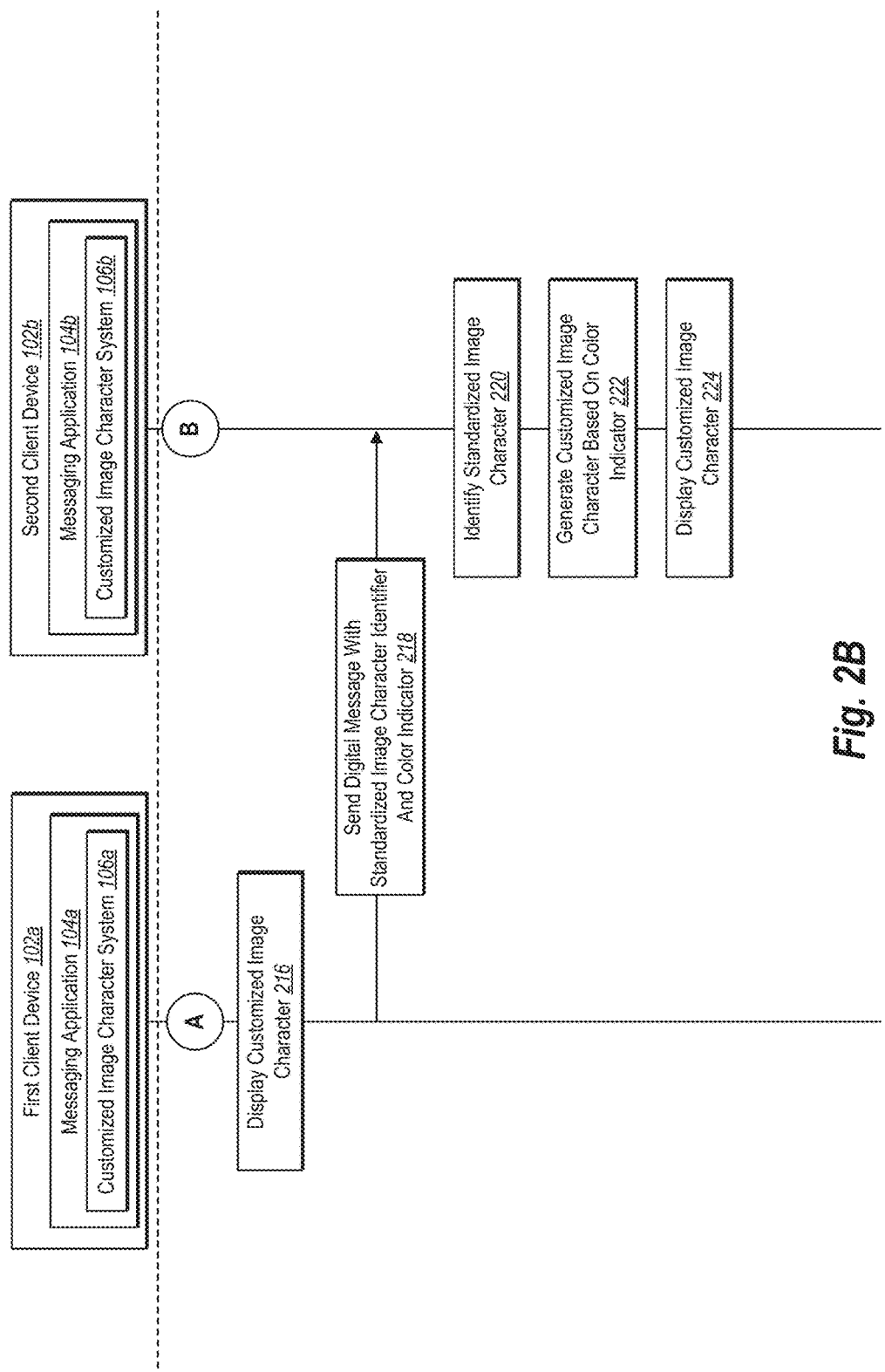

Turning now to FIGS. 2A-2B, additional detail will be provided regarding generating customized image characters in accordance with one or more embodiments. In particular, FIGS. 2A-2B illustrate a representation of a sequence of acts 202-224 performed by the customized image character system in generating and providing customized image characters across client devices. In particular, FIGS. 2A-2B illustrate a series of acts performed by the messaging applications 104a, 104b and the customized image character systems 106a, 106b via the first client device 102a and the second client device 102b. While the following description is provided in reference to the customized image character systems 106a, 106b causing the client devices 102a, 102b to perform the various actions, one will appreciate that the messaging applications 104a, 104b and operating systems of the client devices 102a, 102b can perform one or more of the actions.

As illustrated in FIG. 2A, the messaging application 104a drafts a digital message 202 in response to user input. In particular, the messaging application 104a can draft a digital message, such as an instant message. The messaging application 104a can draft a digital message utilizing any variety of characters, including standardized image characters (e.g., emoji images).

As shown in FIG. 1A, the messaging application 104a can perform the act 204 of receiving selection of a standardized image character. For example, the messaging application 104a can receive user selection of an emoji image as part of drafting a digital message.

As shown in FIG. 2A, the customized image character system 106a performs the act 206 of accessing a repository of standardized image characters. For example, the client device 102a can maintain a repository of standardized image characters that correspond to standardized image character identifiers. To illustrate, the client device 102a can maintain a repository of emoji images where each emoji image corresponds to a particular Unicode identifier.

Upon selection of the standardized image character (at the act 204), the customized image character system 106a performs the act 208 of displaying the standardized image character. In particular, the customized image character system 106a can access the repository of standardized image characters and provide the standardized image character to the messaging application 104a, which then displays the standardized image character. In particular, the customized image character system 106 can provide the standardized image character for display as part of the draft digital message.

As shown in FIG. 2A, the customized image character system 106a also performs the act 210 of providing a color modifier control. For instance, in one or more embodiments, the customized image character system 106a provides a color modifier control (e.g., a color slider) for display via the messaging application 104a. Moreover, the customized image character system 106a detects/receives, via the messaging application 104a, user selection of one or more new colors via the color modifier control in act 212. To illustrate, a user can drag a finger along a color slider to dynamically select a color.

Upon selection of a new color, the customized image character system 106a can then utilize the new color to generate a customized image character from a standardized image character. In particular, as shown in FIG. 2A, the customized image character system 106a performs the act 214 of generating a customized image character based on the new color. For example, the messaging character manager 106a can identify existing color codes within a standardized image character and replace the existing color codes with new color codes corresponding to the new color. Similarly, the messaging character manager 106a can generate a mask of the new color and apply the mask to a standardized image character to generate a customized image character with the new color.

Moreover, as shown in FIG. 2B, the messaging application 104a can perform the act 216 of displaying the customized image character. For example, the messaging application 104a can provide the customized image character for display as part of the draft digital message generated by the messaging application 104a. Moreover, the messaging application 104a can provide the customized image character for display with the color modifier control.

Indeed, in one or more embodiments, the customized image character system 106a provides the customized image character for display with the color modifier control to allow the user to dynamically generate customized image characters as the user interacts with the color modifier control. To illustrate, the customized image character system 106a can detect a user sliding a finger along a color slider and dynamically generate customized image characters that correspond to the positions of the color slider selected by the user. In this manner, the customized image character system 106a dynamically generates customized image characters and enables the user to interactively select a new color based on the customized image characters provided for display with the color slider.

As shown in FIG. 2B, the messaging application 104a can also perform the act 218 of sending the digital message to the second client device 102b. In particular, as shown, the act 218 can include sending the digital message with a standardized image character identifier and a color identifier. For example, in one or more embodiments, the messaging application 104a performs the act 218 by sending a Unicode identifier (e.g., U+1F60D for a smiling face with heart-shaped eyes) together with a color indicator (e.g., code for the new color selected by the user) in metadata of the digital message.

The color indicator can comprise a variety of different data identifiers. For example, the color indicator can include text (i.e., name of a selected color), hexcode (e.g., six-digit hexadecimal representation of colors), RBG values, or some other color indicator. In one or more embodiments, the color indicator includes a mask. For example, a color indicator can include a mask corresponding to the new color selected by the user that, when applied to the standardized image character, will generate the customized image character.

Upon receiving the digital message, the customized image character system 106b can utilize the second client device 102b to generate and display a customized image character. For example, as shown in FIG. 2B, customized image character system 106b performs the acts 220 and 222 of identifying a standardized image character (corresponding to the standardized image character identifier) and generating a customized image character based on the color indicator.

For example, the customized image character system 106b can utilize a Unicode identifier to identify an emoji image. In particular, the customized image character system 106b can identify an emoji image stored on the second client device 102b based on the Unicode identifier in the digital message sent from the first client device 102a. Moreover, the customized image character system 106b can modify the emoji image based on the color indicator. For example, the customized image character system 106b can modify an existing color code in an emoji image with a modified color code corresponding to the new color defined by the color indicator. Similarly, the customized image character system 106b can apply a mask to the standardized image character based on the color indicator.

Upon generating the customized image character, the messaging application 104b can perform the act 224 of displaying the customized image character. In particular, the messaging application 104b can provide the customized image character for display as part of the digital message received from the client device 102a.

The method described in relation to FIGS. 2A-2B is intended to be illustrative of one or more methods in accordance with the present disclosure, and is not intended to limit potential embodiments. Alternative embodiments can include additional, fewer, or different acts than those articulated in FIGS. 2A-2B. For example, although FIGS. 2A-2B illustrate acts performed by separate messaging applications and customized image character systems, in one or more embodiments, the messaging applications are merged with the customized image character systems and perform (or causes a client device to perform) the acts described above.

Additionally, the acts described herein may be performed in a different order, may be repeated or performed in parallel with one another, or may be performed in parallel with different instances of the same or similar acts. For example, although FIGS. 2A-2B illustrate the first client device 102a transmitting a digital message with a customized image character to the second client device 102b, the second client device 102b can also generate and transmit digital messages with customized image characters. Indeed, upon displaying the customized image character (at the step 224), the second client device 102b can also provide a color modifier control for display, generate a second customized image character from a second standardized image character, and send a second digital message with the customized image character to the first client device 102a.

Similarly, although the description in relation to FIG. 2B (at the act 218) describes sending masks as part of a color indicator, in one or more embodiments, the first client device 102a and/or the second client device 102b store or generate masks (e.g., rather than transmitting masks between client devices). To illustrate, the second client device 102b can receive a digital message with a standardized image character identifier and a color indicator. The second client device 102b can then access a mask stored at the second client device 102b corresponding to the standardized image character identifier. The second client device 102b can then apply a new color (based on the color indicator) to the mask and apply the mask to the standardized image character to generate a customized image character.

Figure 3B:
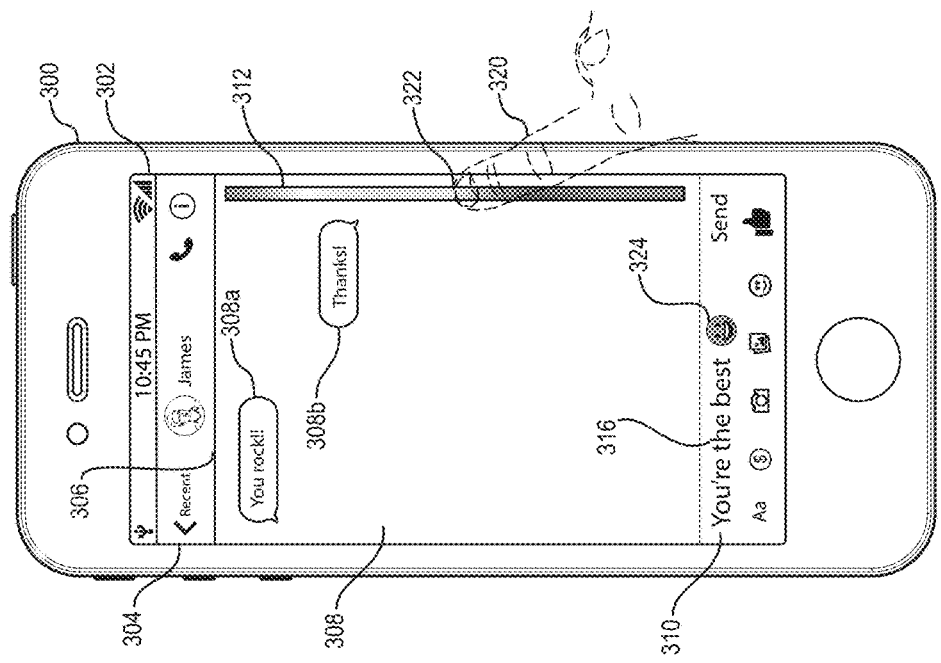
FIGS. 3A-3C illustrate a computing device and example user interface for generating customized image characters in accordance with one or more embodiments.
Figure 3A:
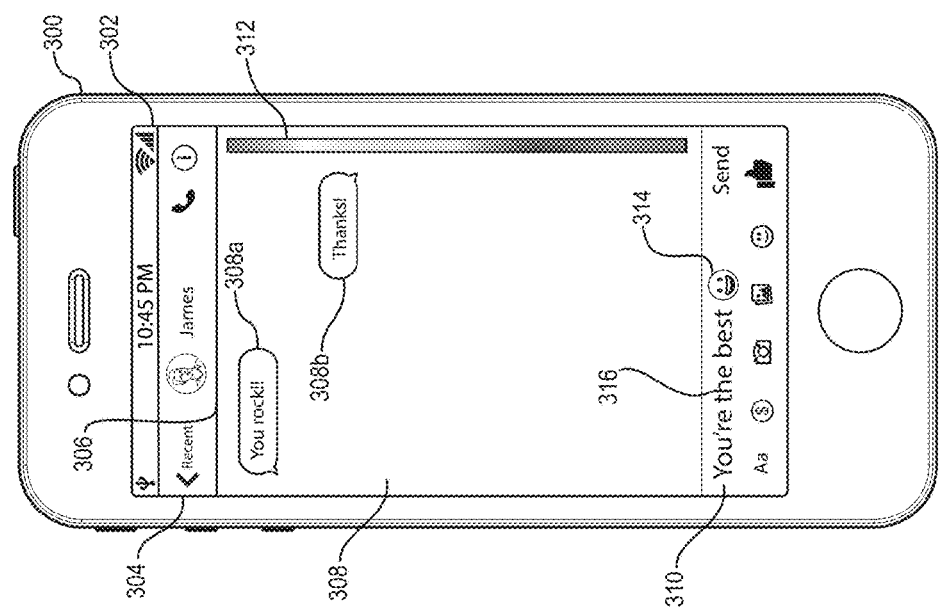
Figure 3C:
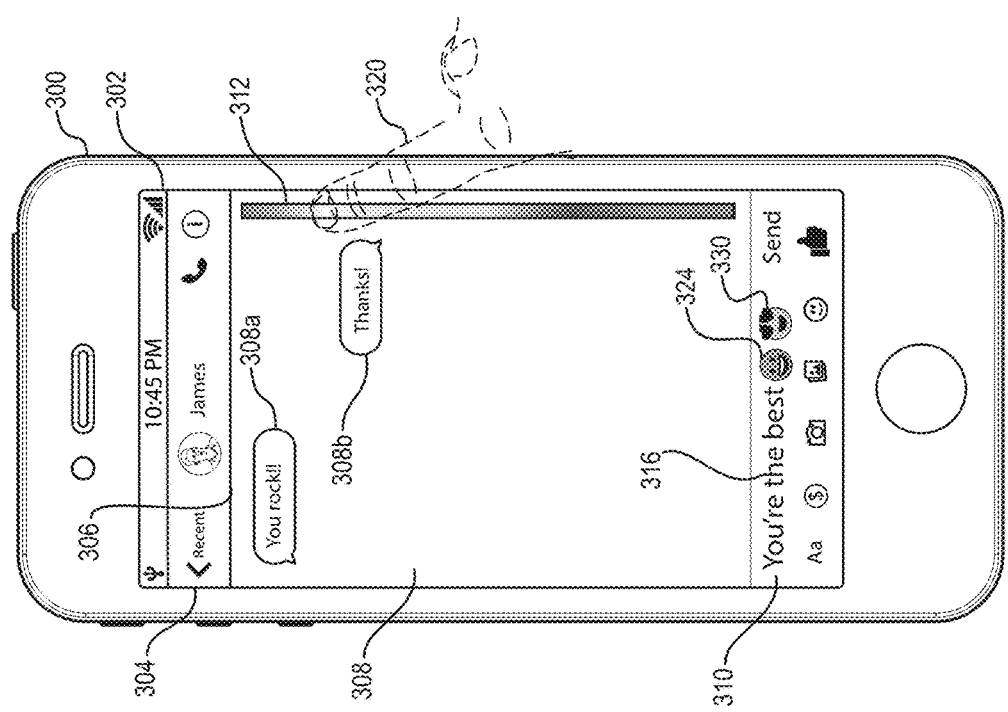

As just mentioned, in one or more embodiments, the customized image character system 106a provides a user interface with a color modifier control for dynamically generating customized image characters. For example, FIGS. 3A-3C illustrate a computing device with a user interface for generating customized image characters based on user interaction with a color modifier control. In particular, FIG. 3A illustrates a computing device 300 (i.e., a smartphone) with a display screen 302 (i.e., touchscreen) showing a user interface 304 corresponding to a messaging application 306.

As shown in FIG. 3A, the user interface 304 includes a message thread area 308. The message thread area 308 displays a plurality of digital messages 308a, 308b between a user of the computing device 300 and a second user (i.e., "James"). In particular, as the user of the computing device 300 and the second user exchange digital messages, the customized image character system provides the digital messages for display within the message thread area 308 of the user interface 304.

In addition to the message thread area 308, the user interface 304 also includes a message drafting input area 310. The message drafting input area 310 allows a user to compose a digital message (i.e., a digital message to send to the second user). Indeed, as illustrated in FIG. 3A, a user has entered a draft digital message 316 comprising text (i.e., "You're the best!") and an emoji image 314 (i.e., a smiley-face emoji). The customized image character system 106a provides the draft digital message 316 for display in the message drafting input area 310.

As shown in FIG. 3A, in response to user selection of the emoji image 314, the customized image character system also provides a color modifier control 312 in the user interface 304. In particular, in relation to the embodiment of FIG. 3A, the customized image character system provides the color modifier control 312 in the form of a color slider. Specifically, the color modifier control 312 comprises a color slider with a plurality of positions corresponding to different colors. In response to user interaction at different positions of the color slider, the customized image character system generates customized emoji images corresponding to the different positions of the color slider.

For example, FIG. 3B illustrates a finger 320 interacting with the color modifier control 312. In particular, a user utilizes the finger 320 to select a position 322 of the color modifier control 312. In response to the user selecting the position 322, the customized image character system generates a customized emoji character with a color corresponding to the position 322. Specifically, the customized image character system 106 modifies the emoji image 314 to reflect the color corresponding to the position 322. More specifically, the customized image character system replaces an original color of the emoji image 314 with a new color corresponding to the selected position 322 of the color modifier control 312 to generate a customized emoji image 324. In one or more implementations, the customized emoji image 324 is generated on the fly or in real time in response to user input relative to the color modifier control 312. In other words, the customized emoji image 324 does not exist on the computing device 300 prior to the customized image character system generating the customized emoji image 324 in response to the user selecting the emoji image 314 and the color position 322 on the color modifier control 312.

Furthermore, as shown in FIG. 3B, the customized image character system provides the customized emoji image 324 for display. In particular, the customized image character system provides the customized emoji image 324 for display in the message drafting input area 310 with the draft digital message 316. By providing the customized emoji image 324 for display, the customized image character system allows a user to see how the customized emoji image 324 will appear in the draft digital message 316.

As mentioned above, the customized image character system can dynamically generate and provide customized image characters based on user interaction with a color modifier control. For example, as a user drags the finger 320 along different positions of the color modifier control 312, the customized image character system can dynamically generate and provide customized image characters for display. To illustrate, the user can drag the finger 320 to a second position along the color modifier control 312 and the customized image character system can provide a second customized emoji image for display reflecting a second color corresponding to the second position. Thus, the customized image character system can allow a user to select a variety of different positions along the color modifier control 312 and view a plurality of customized emoji images before deciding on a desired color for the customized emoji image 324.

In addition to the customized emoji image 324, the customized image character system can also provide a variety of different customized image characters in the draft digital message 316. Indeed, a user can select a second emoji image and a second color and the customized image character system can generate a second customized emoji image. For example, FIG. 3C illustrates the customized image character system 106 generating and providing a second customized emoji image 330.

Specifically, in relation to FIG. 3C the user selects a second emoji image (i.e., a smiley-face emoji image with heart eyes). In response to user selection of the second emoji image, the customized image character system provides the color modifier control 312 for display. Moreover, the customized image character system receives a user selection (e.g., via the finger 320) of a new color via the color modifier control 312, and generates the second customized emoji image 330. The customized image character system then provides the customized emoji image 324 and the second customized emoji image 330 for display as part of the draft digital message 316 via the message drafting element 310.

As mentioned above, the customized image character system can also transmit digital messages that comprise customized image characters to additional client devices. In particular, the customized image character system can send a digital message such that receiving devices can display the customized image characters. Moreover, the receiving devices can then generate and send customized image characters.

Figure 4B:
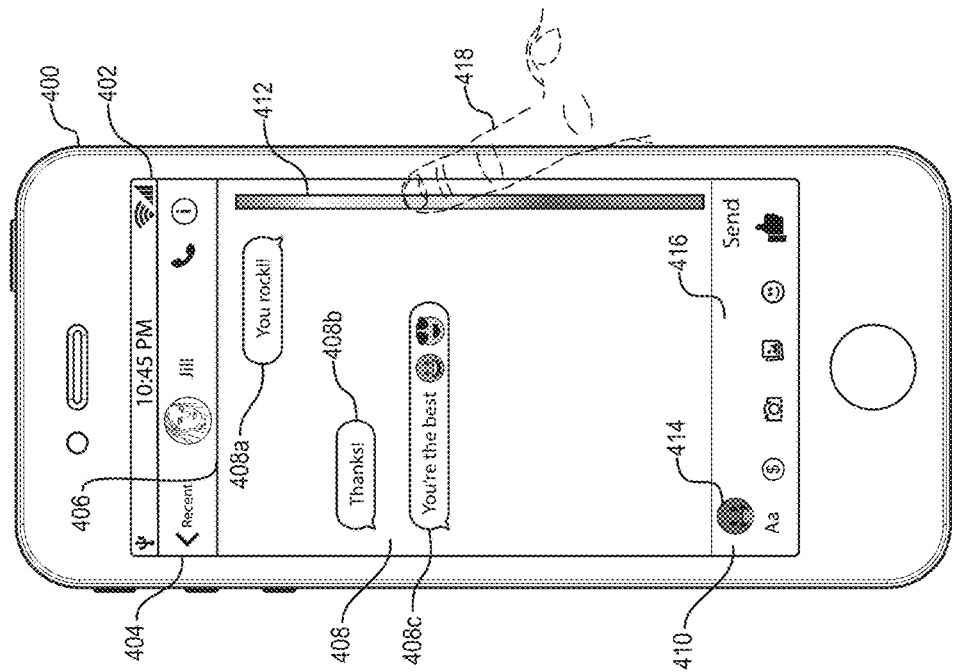
FIGS. 4A-4C illustrate a second computing device and user interface for generating customized image characters in accordance with one or more embodiments.
Figure 4A:
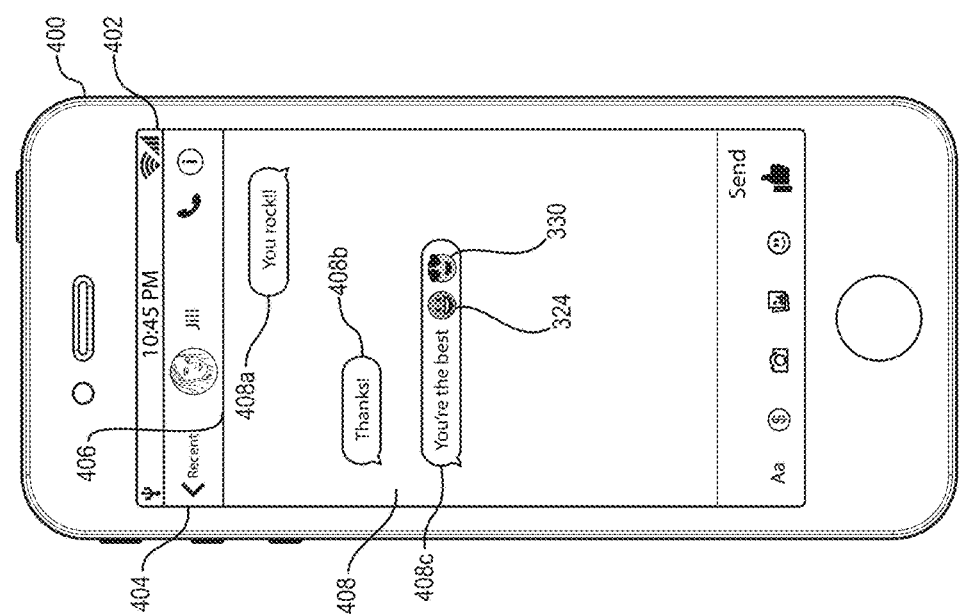
Figure 4C:
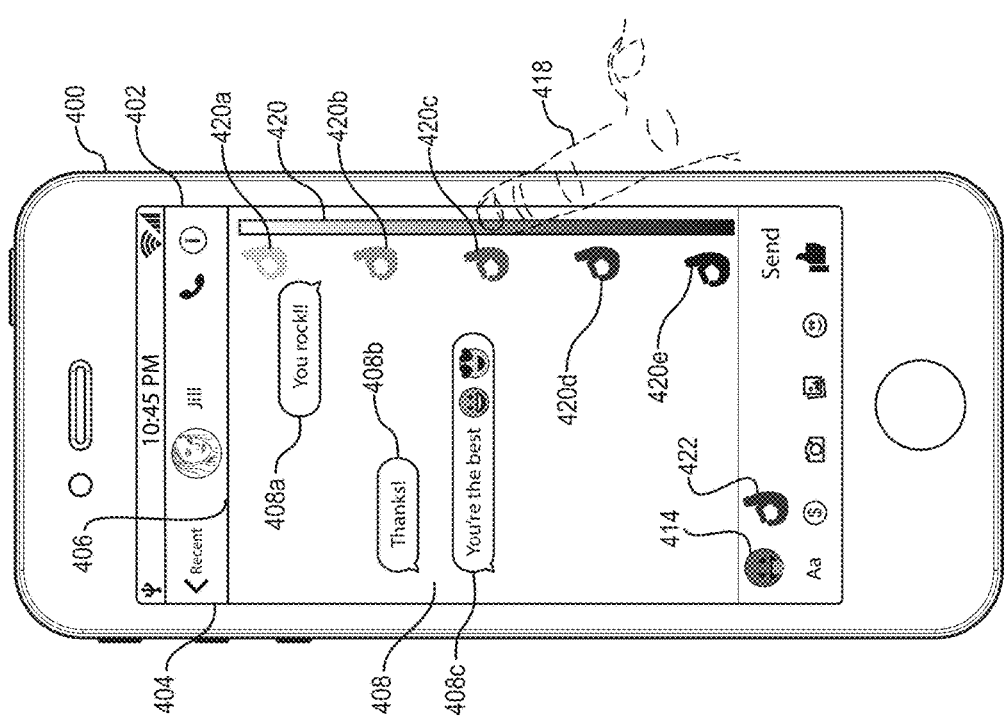

For example, FIGS. 4A-4C illustrate receiving a digital message and generating customized image characters from the received digital message in accordance with one or more embodiments. In particular, FIG. 4 illustrates a second computing device 400 corresponding to a second user (i.e., "James" as described in FIGS. 3A-3C). As shown, the second computing device 400 comprises a display screen 402 showing a user interface 404 corresponding to a messaging application 406.

In relation to the embodiment of FIG. 4, the messaging application 406 is the same as the messaging application 306. However, in other embodiments, the messaging application 406 can differ from the messaging application 306. For example, the messaging application 306 can comprise an application designed for a first operating system and the messaging application 406 can comprise an application designed for a second operating system. Similarly, the messaging application 306 can comprise an application designed by a first developer and the messaging application 406 can comprise an application designed by a second developer.

As shown in FIG. 4, the user interface 404 of the messaging application 406 also includes a message thread area 408 displaying a plurality of digital messages 408a, 408b (i.e., messages corresponding to the digital messages 308a, 308b with a first user of the computing device 300, "Jill"). The message thread area 408 also includes the digital message 408c, which corresponds to the draft digital message 316 drafted by the computing device 300 (as described in relation to FIG. 3C). As shown, the digital message 408c in the user interface 404 includes the customized emoji images 324, 330.

The customized image character system generates the digital message 408c and the customized emoji images 324, 330 based on a digital message transmitted from the first computing device 300 to the second computing device 400. In particular, as described above, the first computing device 300 sends a digital message with Unicode identifiers and color indicators corresponding to the customized image characters 324, 330 to the second computing device 400. The second computing device 400 receives the Unicode identifiers and color indicators. Moreover, the customized image character system determines emoji images based on the Unicode identifiers and modifies the emoji images based on the color indicators to generate the customized emoji images 324, 330. The customized image character system then provides the customized emoji images 324, 330 for display with the digital message 408c.

The customized image character system can then utilize the second computing device 400 to generate and send additional digital messages with customized image characters. For example, FIG. 4B illustrates utilizing the second computing device 400 to draft a digital message responding to the digital message 408c that includes a customized emoji image. Specifically, FIG. 4B illustrates the user interface 404 with a draft digital message 416 that includes a customized emoji image 414 in a message drafting element 410.

In relation to FIG. 4B, the customized image character system receives user selection of an emoji image and provides a color modifier control 412. Based on user selection of a new color via the color modifier control 412 (i.e., selection of a position corresponding to a new color), the customized image character system generates the customized emoji image 414. Moreover, the customized image character system provides the customized emoji image 414 for display in the draft digital message 416.

As mentioned, in one or more embodiments, the customized image character system provides the color modifier control 412 for display in response to user selection of a standardized image character (e.g., a press and release event in relation to an emoji image). The customized image character system can provide the color modifier control 412 for display in response to a variety of additional triggering events. For example, in one or more embodiments, the customized image character system provides the color modifier control 412 in response to receiving (or displaying) a digital message that includes a customized image character. Similarly, the customized image character system can provide the color modifier control 412 whenever a user begins responding to a digital message that includes an customized image character. Further, the customized image character system 10 can provide the color modifier control 412 when a user indicates a desire to add a standardized image character to a draft digital message (e.g., upon accessing a list of standardized image characters).

As shown in FIG. 4B, the customized image character system can provide a color modifier control that includes a wide variety of different colors. For example, in one or more embodiments, the customized image character system can provide a color modifier control with positions corresponding to 147 different hexcode colors. In other embodiments, the customized image character system can provide a color modifier control with positions corresponding to a larger or smaller number of colors (e.g., 16.7 million positions corresponding to 16.7 million colors or 10 positions corresponding to 10 colors).

In some embodiments, the customized image character system limits the range of colors available to select for a customized image character. For example, in one or more embodiments, the customized image character system provides positions in a color modifier control that fall within a limited range of colors. To illustrate, some standardized image characters exist for shapes having different skin tones (e.g., five thumbs-up emoji images with five different skin tones). In one or more embodiments, the customized image character system generates a color modifier control with positions corresponding to colors based on the different skin tones of the standardized image characters.

For example, FIG. 4C illustrates the second computing device 400 upon selection of an emoji image having a skin tone. As shown, the customized image character system provides a second color modifier control 420 with a range of colors based on the selected emoji image. In particular, the customized image character system determines that there are five emoji images with a similar shape to the selected emoji image, where each of the five emoji images have a unique skin tone. The customized image character system generates the second color modifier control 420 based on the five skin tones corresponding to the five emoji images.

Specifically, the customized image character system generates the second color modifier control 420 such that positions along the color modifier control correspond to colors scaled between the five skin tones. To illustrate, positions at the top of the second color modifier control 420 correspond to the lightest skin tone, while positions at the bottom of the second color modifier control 420 correspond to the darkest skin tone.

In addition, the customized image character system generates the second color modifier control 420 with indicators 420a-420e corresponding to the five skin tones from the five existing emoji images. Specifically, the customized image character system places the indicators 420a-420e at positions along the second color modifier control 420 that correspond to the five skin tones from the five emoji images. In this manner, the customized image character system can provide the second color modifier control 420 with a visual indication of how positions along the second color modifier control 420 correspond to colors in standardized image characters.

As shown in FIG. 4C, the customized image character system detects selection of a color via the second color modifier control 420 (e.g., a selection of a position along the second color modifier control 420 by the finger 418). In response, the customized image character system generates a second customized emoji image 422 corresponding to the selected color. Moreover, the customized image character system 106 displays the second customized emoji image 422 as part of the draft digital message 416 with the customized emoji image 414.

As mentioned above, in one or more embodiments, the customized image character system generates customized image characters by modifying existing color codes in standardized image characters. In particular, the customized image character system can identify color codes in image files and replace the color codes with modified color codes to generate customized image characters.

Standardized image characters can comprise a variety of different file formats. In one or more embodiments, the customized image character system selects different methods for generating customized image characters depending on the type of image file format. For instance, in one or more embodiments, the customized image character system replaces color codes with regard to standardized image characters defined in a vector image file. As used herein, the term "vector image file" refers to an image file that defines a digital image with one or more vectors. In particular, a vector image file includes an image file that defines a digital image based on curves or line segments (rather than individual pixels, such as a bitmap). For example, the term "vector image file" includes image files in scalable vector graphics (SVG) file format, CGM file format, EPS file format, AI file format, PDF file format, TrueType format, or OpenType format.

The customized image character system can generate customized image characters from standardized image characters by identifying existing color codes in the image file (e.g., in a vector image file) and replacing the color codes with a new color code. For example, FIG. 5 illustrates generating a customized image character by modifying an existing color code in accordance with one or more embodiments.

Figure 5:
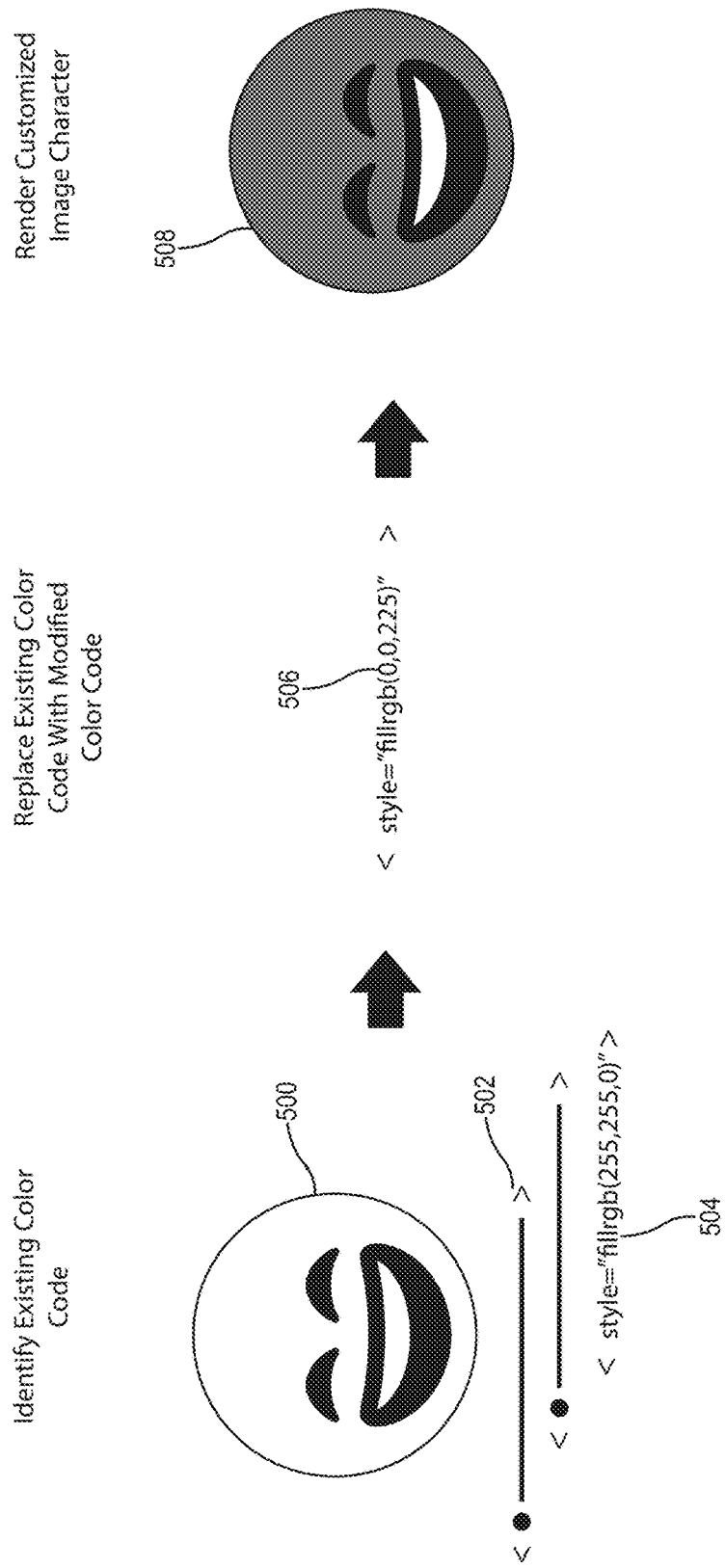
FIG. 5 illustrates a schematic representation of identifying and modifying a color code in a standardized image character in accordance with one or more embodiments.

Specifically, FIG. 5 illustrates a standardized image character 500 and corresponding code from a vector image file 502. As shown, the customized image character system can search the vector image file 502 and identify an existing color code 504. The existing color code 504 defines an original color for the standardized image character 500.

The customized image character system can identify the existing color code 504 utilizing a variety of different techniques. For example, in one or more embodiments, the customized image character system conducts a search for a color code tag. For instance, in relation to the embodiment of FIG. 5, the customized image character system can conduct a search for a tag (e.g., "rgb," "fillrgb," or some other text) identifying the portion of the vector image file 502 defining color.

Similarly, the customized image character system can identify the color code by search for color text. For example, the customized image character system can identify the existing color in the standardized image character and search for text corresponding to the color in the vector image file. To illustrate, in relation to FIG. 5, the customized image character system can determine that an existing standardized image character includes an original yellow color (or a plurality of yellow colors in a gradation of yellow). The customized image character system can search the vector file for text corresponding to the original yellow color (i.e., "255, 255, 0" or some other text identifying the original yellow color).

Upon identifying the existing color code, the customized image character system can also replace the existing color code with a modified color code. For example, upon identifying a color tag, the customized image character system can replace the color code corresponding to the color tag with a modified color code. Similarly, upon identifying color text, the customized image character system can replace the color text with text corresponding to a modified color. To illustrate, in relation to FIG. 5, the customized image character system replaces the original color code ("255, 255, 0") with a modified color code ("0, 0, 225").

Upon replacing the existing color code with the modified color code, the customized image character system can then render a customized image character 508. In particular, the customized image character system can render the customized image character 508 based on the vector image file 502 with the modified color code 506. This results in the customized image character 508 with a new color.

Notably, the customized image character system can generate the customized image character 508 by modifying a subset of colors of the standardized image character 500. In particular, the customized image character system can change a first color from the standardized image character to a second color, while maintaining a third color from the standardized image character 500.

To illustrate, the eyes, mouth, and teeth portrayed in the standardized image character 500 can comprise different colors than the remainder of the face portrayed in the standardized image character 500. The customized image character system can modify the color of the face portrayed in the standardized image character 500 while maintaining the color of the eyes, mouth, and teeth. Thus, the customized image character 508 can have some new colors and some colors maintained from the standardized image character 500.

Furthermore, in one or more embodiments, the customized image character system allows a user to select which portion of a standardized image character that the user wishes to modify in generating a customized image character. For instance, with regard to the previous example, the customized image character system can allow a user to select one or more of a face color, an eye color, a mouth color, or a teeth color to modify when generating a customized image character. The customized image character system can then detect user input of a color and modify selected portions to generate a customized image character.

Moreover, as mentioned previously, in one or more embodiments, the customized image character system generates and applies masks to a standardized image character to generate a customized image character. For example, in one or more embodiments, the customized image character system applies masks to raster image files. As used herein, the term "raster image files" refers to image files that define digital images in a dot matrix data structure. In particular, the term "raster image files" includes image files that define digital images as a plurality of individual pixels (e.g., as a bitmap). For example, raster image files include JPEG, PNG, TIFF, GIF, or BMP files.

To illustrate, in one or more embodiments, the customized image character system determines that a standardized image character is defined by raster image files. In response, the customized image character system generates and applies a mask to the standardized image character to generate a customized image character. For example, FIG. 6 illustrates generating and applying a mask to a standardized image character in accordance with one or more embodiments.

Figure 6:
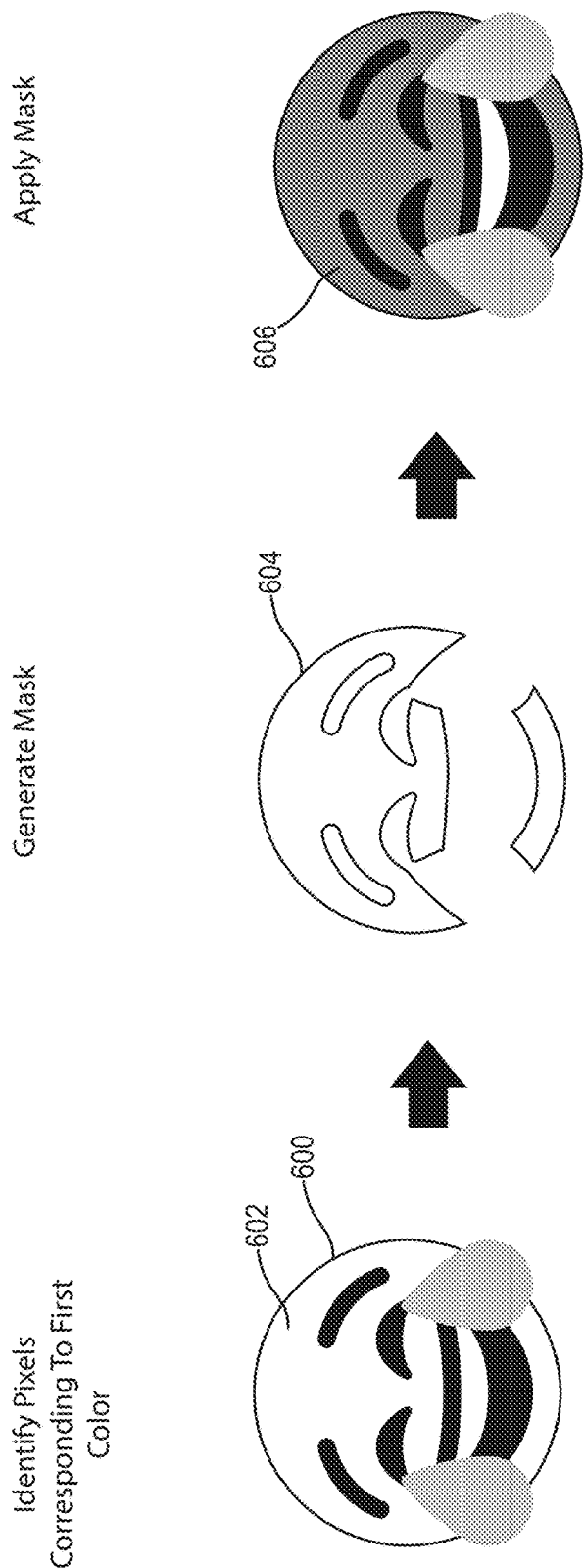
FIG. 6 illustrates a schematic representation of generating and applying a mask to a standardized image character in accordance with one or more embodiments.

In particular, FIG. 6 illustrates a standardized image character 600 with a plurality of pixels 602 corresponding to an original color. As shown in FIG. 6, the customized image character system identifies the pixels 602 of the standardized image character 600 corresponding to the original color. For example, the customized image character system can apply a color filter or color clustering algorithm in the standardized image character 600 to identify the pixels 602 corresponding to the original color.

Moreover, as shown in FIG. 6, the customized image character system also generates a mask 604. In particular, the customized image character system generates the mask 604 based on the identified plurality of pixels 602 corresponding to the original color. To illustrate, the customized image character system can generate the mask 604 as a plurality of pixels (i.e., pixels that can be changed to different colors), where the plurality of pixels in the mask 604 correspond to the plurality of pixels 602 in the standardized image character 600.

As illustrated in FIG. 6, the customized image character system can also apply the mask 604 to generate a customized image character 606. For example, the customized image character system can receive a new color and define the pixels in the mask 604 based on the new color. The customized image character system can then apply the mask 604 to the standardized image character 600. In particular, the customized image character system can apply the mask 604 as an overlay to the standardized image character 600. Similarly, in one or more embodiments, the customized image character system replaces the plurality of pixels 602 in the standardized image character 600 with the mask 604. As shown, this results in the customized image character 606 with a new customized color.

As shown in FIG. 6, in generating the customized image character 606, the customized image character system can replace one color in the standardized image character 600 while maintaining other colors. Indeed, the customized image character system can modify a first color corresponding to a first portion (e.g., the face) to a second color, while maintaining a third color of a second portion (e.g., the tears).

Furthermore, as mentioned above, in one or more embodiments, the customized image character system allows a user to select which portion of the standardized image character 600 that the user wishes to modify. To illustrate, the customized image character system can allow a user to select the face, the tears, the eyes, and/or the mouth in the standardized image character 600. The customized image character system 106 can then generate a customized image character by modifying the color of the face, the tears, the eyes, and/or the mouth. Indeed, the customized image character system can modify different portions as different colors (e.g., change the face to one color and change the eyes to another color).

Indeed, although many of the examples herein describe generating a customized image character by replacing a single original color with a single new color, the customized image character system can generate a customized image character by replacing one or more original colors with one or more new colors. To illustrate, some standardized image characters define a face of an emoji image as a gradient of colors rather than a single color. In one or more embodiments, the customized image character system 106 can replace the first gradient of colors with a second gradient of colors to generate a customized image character.

For example, the customized image character system can identify a color code defining an existing gradient in a standardized image character. The customized image character system can then replace the color code defining the existing gradient with a new gradient. For example, the customized image character system can provide a color modifier control that shows a gradient of colors at each position of a color slider. The customized image character system can detect user selection of a position of the color modifier control and replace an existing gradient with the new color gradient corresponding to the position of the color modifier control.

Similarly, the customized image character system can identify pixels in a standardized image character that portray a gradient of colors (e.g., identify all colors within a particular range in a standardized image character). The customized image character system can then generate a mask based on the identified pixels that portray the gradient of colors. Moreover, the customized image character system can replace the identified pixels by applying the mask to generate a customized image character.

For example, the customized image character system can replace the identified pixels by applying a mask with a second gradient of colors. For example, the customized image character system can generate the second gradient of colors based on the first gradient of colors. To illustrate, the customized image character system can generate a mask with the second gradient of colors by offsetting each identified pixel in the standardized image character (e.g., by a particular color offset). The customized image character system can then apply the mask with the second gradient to the standardized image character. This results in a mask with a second gradient similar to the first gradient (but with new colors).

Figure 7:
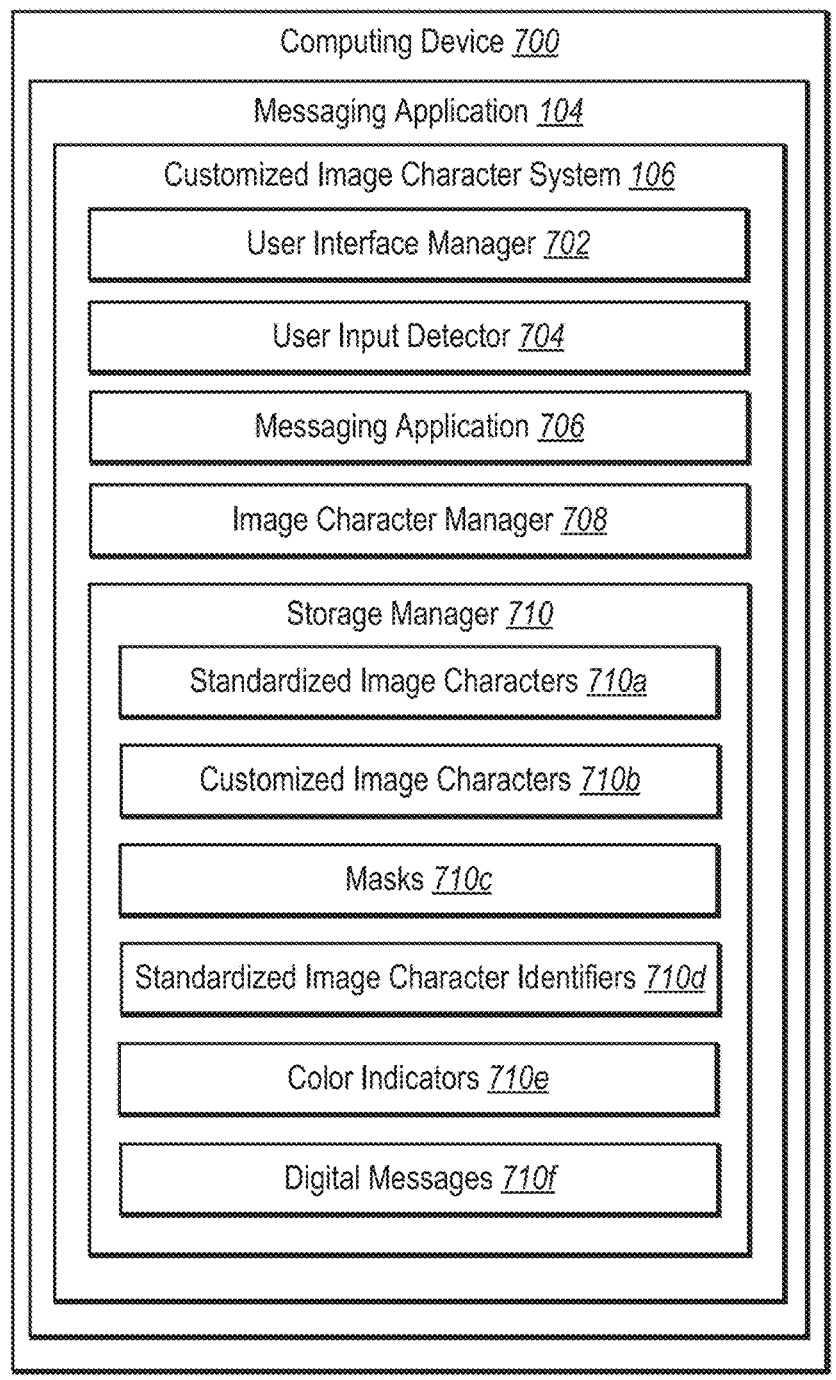
FIG. 7 illustrates a schematic diagram of a customized image character system in accordance with one or more embodiments.

Turning now to FIG. 7, additional detail will be provided regarding various components and capabilities of the customized image character system. In particular, FIG. 7 illustrates a computing device 700 on which a messaging application 104 and a customized image character system 106 can operate. As shown, the customized image character system 106 may include, but is not limited to a user interface manager 702; a user input detector 704; a messaging application 706; an image character manager 708; and a storage manager 710 (comprising standardized image characters 710a, customized image characters 710b, masks 710c, standardized image character identifiers 710d, color indicators 710e, and digital messages 710f).

As just mentioned, and as illustrated in FIG. 7, the customized image character system 106 includes the user interface manager 702. The user interface manager 702 can provide, manage, and/or control a graphical user interface (or simply "user interface") for use with the customized image character system 106 (e.g., the user interfaces 304 and 404). In particular, the user interface manager 702 may facilitate presentation of information by way of an external component of a client device. For example, the user interface manager 702 may display a user interface by way of a display screen associated with the client device.

The user interface may be composed of a plurality of graphical components, objects, and/or elements that allow a user to perform a function (e.g., a color modifier control, a message drafting element, or a message thread area as described above). The user interface manager 702 can present, via the client device, a variety of types of information, including text, images, video, audio, characters, standardized image characters, customized image characters, or other information. Moreover, the user interface manager 702 can provide a variety of user interfaces specific to any variety of functions, programs, applications, plug-ins, devices, operating systems, and/or components of the client device. Additional details with respect to various example user interface elements are described throughout with regard to various embodiments containing user interfaces.

In addition to the user interface manager 702, as shown in FIG. 7, the customized image character system 106 also includes the user input detector 704. The user input detector 704 can detect, identify, monitor, receive, process, capture, and/or record various types of user input. For example, the user input detector 704 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 704 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 704 can detect and identify various types of user interactions with user input devices, such as select events, drag events, scroll events, and so forth. The user input detector 704 can also detect a user interaction with respect to a variety of user interface elements. For example, the customized image character system 106 can detect user interaction with a color modifier control and determine a selection of a color corresponding to the detected user interaction.

In addition, as illustrated in FIG. 7, the customized image character system 106 also includes the messaging application 706 (e.g., an exemplary embodiment of the messaging applications 104a-104n). The messaging application 706 can create, generate, send, transmit, and/or receive digital messages. In particular, the messaging application 706 can send or receive text messages, instant messages, or any other type of digital message.

Moreover, as shown in FIG. 7, the customized image character system 106 may also include the image character manager 708 (e.g., an exemplary embodiment of the messaging character managers 106a-106n). The image character manager 708 can create, generate, identify, determine, and manage image characters, including standardized image characters and customized image characters. For example, the image character manager 708 can identify and retrieve standardized image characters 710*a* based on standardized image character identifiers 710*d*.

Moreover, the image character manager 708 can generate customized image characters. To illustrate, the image character manager 708 can generate a customized image character from a standardized image character based on user selection of a color from a color modifier control. Similarly, the image character manager 708 can generate a customized image character based on a standardized image character identifier and a color indicator received in a digital message.

Furthermore, as illustrated in FIG. 7, the customized image character system 106 also includes the storage manager 710. The storage manager 710 can maintain data of any type, size, or kind, as necessary to perform the functions of the customized image character system 106. As shown, the storage manager 710 includes standardized image characters 710*a* (e.g., emoji images), customized image characters 710*b* (e.g., customized emoji images), masks 710*c*, standardized image character identifiers 710*d* (e.g., Unicode identifiers that identify emoji images), color indicators 710*e*, and digital messages 710*f* (e.g., digital messages sent, received, and or drafted).

Each of the components 702-710 of the customized image character system 106 and their corresponding elements may be in communication with one another using any suitable communication technologies. It will be recognized that although components 702-710 and their corresponding elements are shown to be separate in FIG. 7, any of components 702-710 and their corresponding elements may be combined into fewer components, such as into a single facility or module, divided into more components, or configured into different components as may serve a particular embodiment.

The components 702-710 and their corresponding elements can comprise software, hardware, or both. For example, the components 702-710 and their corresponding elements can comprise one or more instructions stored on a computer-readable storage medium and executable by processors of one or more computing devices. The components 702-710 and their corresponding elements can comprise hardware, such as a special purpose processing device to perform a certain function or group of functions. Additionally, or alternatively, the components 702-710 and their corresponding elements can comprise a combination of computer-executable instructions and hardware.

Furthermore, the components 702-710 of the customized image character system 106 may, for example, be implemented as one or more stand-alone applications, as one or more modules of an application, as one or more plug-ins, as one or more library functions or functions that may be called by other applications, and/or as a cloud-computing model. Thus, the components 702-710 of the customized image character system 106 may be implemented as a stand-alone application, such as a desktop or mobile application. Furthermore, the components 702-710 of the customized image character system 106 may be implemented as one or more web-based applications hosted on a remote server. Alternatively, or additionally, the components of the customized image character system 106 may be implemented in a suit of mobile device applications or "apps."

Figure 8:
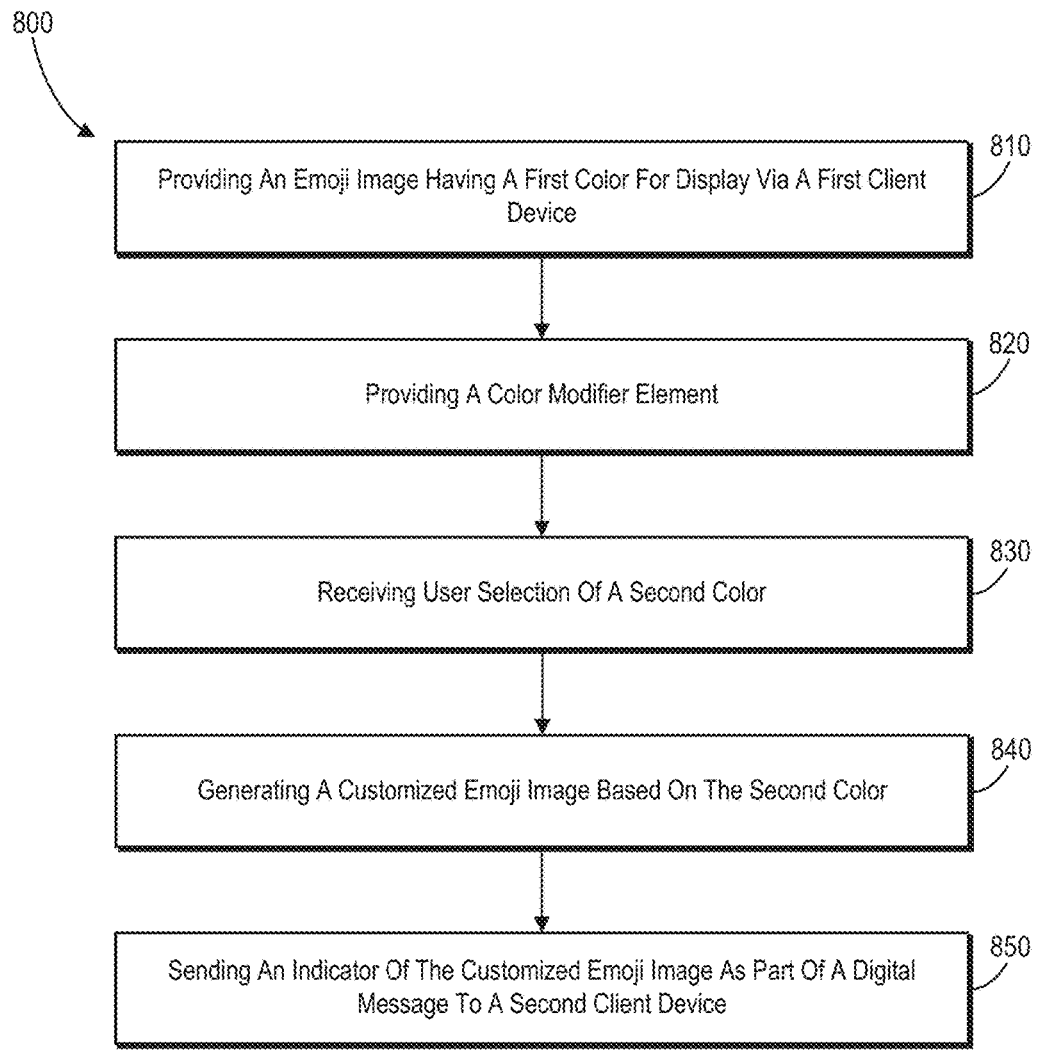
FIG. 8 illustrates a flow chart of a method of generating and providing a customized image character in accordance with one or more embodiments.
Figure 9:
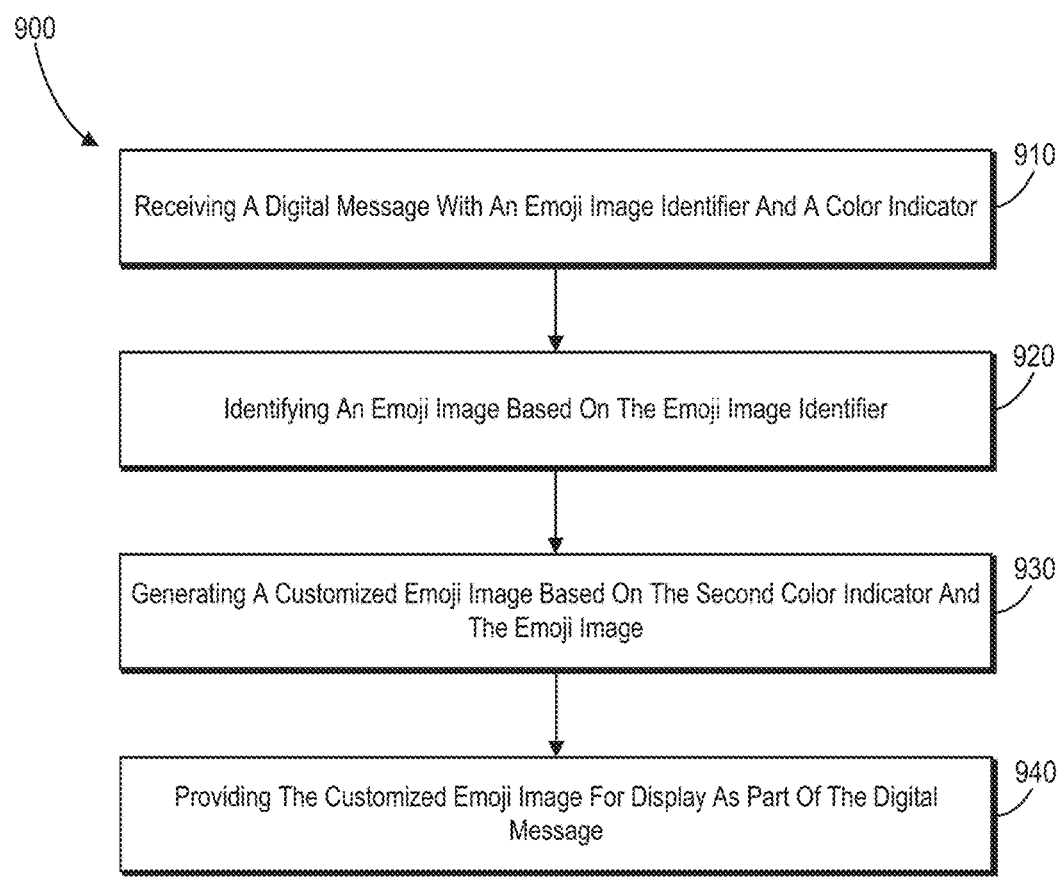
FIG. 9 illustrates another flow chart of a method of generating and providing a customized image character in accordance with one or more embodiments.

FIGS. 1-7, the corresponding text, and the examples, provide a number of different systems and devices that generate and provide customized image characters. In addition to the foregoing, embodiments can also be described in terms of flowcharts comprising acts and steps in a method for accomplishing a particular result. For example, FIGS. 8-9 illustrate flowcharts of exemplary methods in accordance with one or more embodiments of the present invention. The methods described in relation to FIGS. 8-9 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of generating and providing customized image characters in accordance with one or more embodiments. In one or more embodiments, the method 800 is performed in a digital medium environment that includes the customized image character system 106. The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8, the method 800 includes an act 810 of providing an emoji image having a first color for display via a first client device. In particular, in one or more embodiments, the act 810 includes providing an emoji image for display via a user interface of a messaging application of a first client device, wherein the emoji image comprises a first color.

In addition, as shown in FIG. 8, the method 800 also includes an act 820 of providing a color modifier control. In particular, the act 820 can include providing a color modifier control within the user interface. For example, in one or more embodiments, the color modifier control comprises a color slider that dynamically modifies the first color of the emoji image based on selected positions of the color slider. For instance, the act 820 can include dynamically providing the customized emoji image for display within the draft digital message in response to user interaction with the color modifier control. Moreover, in one or more embodiments, the act 820 includes providing the emoji image for display as part of a draft digital message within the user interface of the messaging application on the first client device; and providing the color modifier control adjacent to the draft digital message.

Further, as shown in FIG. 8, the method 800 also include an act 830 receiving user selection of a second color. In particular, the act 830 can include receiving a user selection of a second color via the color modifier control. For instance, the act 830 can include receiving selection of a position of a color slider corresponding to the second color.

As illustrated in FIG. 8, the method 800 also includes an act 840 of generating a customized emoji image based on the second color. In particular, the act 840 can include generating, by at least one processor, a customized emoji image by dynamically modifying the first color of the emoji image to the second color based on receiving the user selection of the second color via the color modifier control. For example, in one or more embodiments, the emoji image comprises a first portion of the first color and a second portion of a third color and the act 840 includes modifying the first color of the first portion to the second color; and maintaining the third color of the second portion.

Moreover, as illustrated in FIG. 8, the method also includes an act 850 of sending an indicator of the customized emoji image as part of a digital message to a second client device. In particular, the act 850 can include sending, by the at least one processor, an indicator of the customized emoji image as part of a digital message from the first client device to a second client device such that the second client device displays the customized emoji image as part of the digital message. For example, in one or more embodiments, the act 850 includes sending an emoji image identifier and a color indicator corresponding to the second color.

In one or more embodiments, the emoji image comprises a vector image file, and modifying the first color of the emoji image character comprises: identifying an existing color code corresponding to the first color within the vector image file; and replacing the existing color code within the vector image file with a modified color code corresponding to the second color based on the user interaction with the color modifier control.

Moreover, in one or more embodiments, the emoji image comprises a raster image file, and modifying the first color of the emoji image comprises: determining pixels of the raster image file corresponding to the first color; generating a mask corresponding to the pixels of the raster image file having the first color; and applying the mask to the emoji image to generate the customized emoji image.

FIG. 9 illustrates another flowchart of a series of acts in a method 900 of generating and providing customized image characters in accordance with one or more embodiments. As illustrated in FIG. 9, the method 900 includes an act 910 of receiving a digital message with an emoji image identifier and a color indicator. In particular, the act 910 can include receiving, at a first client device, a digital message from a second client device, wherein the digital message comprises an emoji image identifier and a color indicator.

In addition, as shown in FIG. 9, the method 900 also includes an act 920 of identifying an emoji image based on the emoji image identifier. In particular, the act 920 can include identifying, based on the emoji image identifier in the digital message, an emoji image on the first client device, wherein the emoji image comprises a first color.

Moreover, as shown in FIG. 9, the method 900 also includes an act 930 of generating a customized emoji image based on the second color indicator and the emoji image. In particular, the act 930 can include generating a customized emoji image by modifying the first color of the emoji image on the first client device to a second color based on the color indicator from the digital message.

Further, as illustrated in FIG. 9, the method 900 also includes an act 940 of providing the customized emoji image for display as part of the digital message. In particular, the act 940 can include providing the customized emoji image for display as part of the digital message via a user interface of a messaging application on the first client device.

For example, in one or more embodiments, the emoji image comprises a vector image file, and modifying the first color of the emoji image comprises: identifying an existing color code corresponding to the first color within the vector image file; and replacing the existing color code within the vector image file with a modified color code corresponding to the second color based on the color indicator from the digital message.

Similarly, in one or more embodiments, the emoji image comprises a raster image file, and modifying the first color of the emoji image comprises: determining pixels of the raster image file corresponding to the first color; identifying a mask at the first client device corresponding to the pixels of the raster image file having the first color; and applying the mask to the emoji image based on the color indicator from the digital message to generate the customized emoji image.

Furthermore, in one or more embodiments, the method 900 includes providing the customized emoji image for display via the user interface together with a second emoji image and a color modifier control; generating a second customized emoji image by dynamically modifying a first color of the second emoji image to a second color based on user interaction with the color modifier control; and sending the second customized emoji image as part of a second digital message from the first client device to the second client device such that the second client device displays the second customized emoji image as part of the second digital message.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
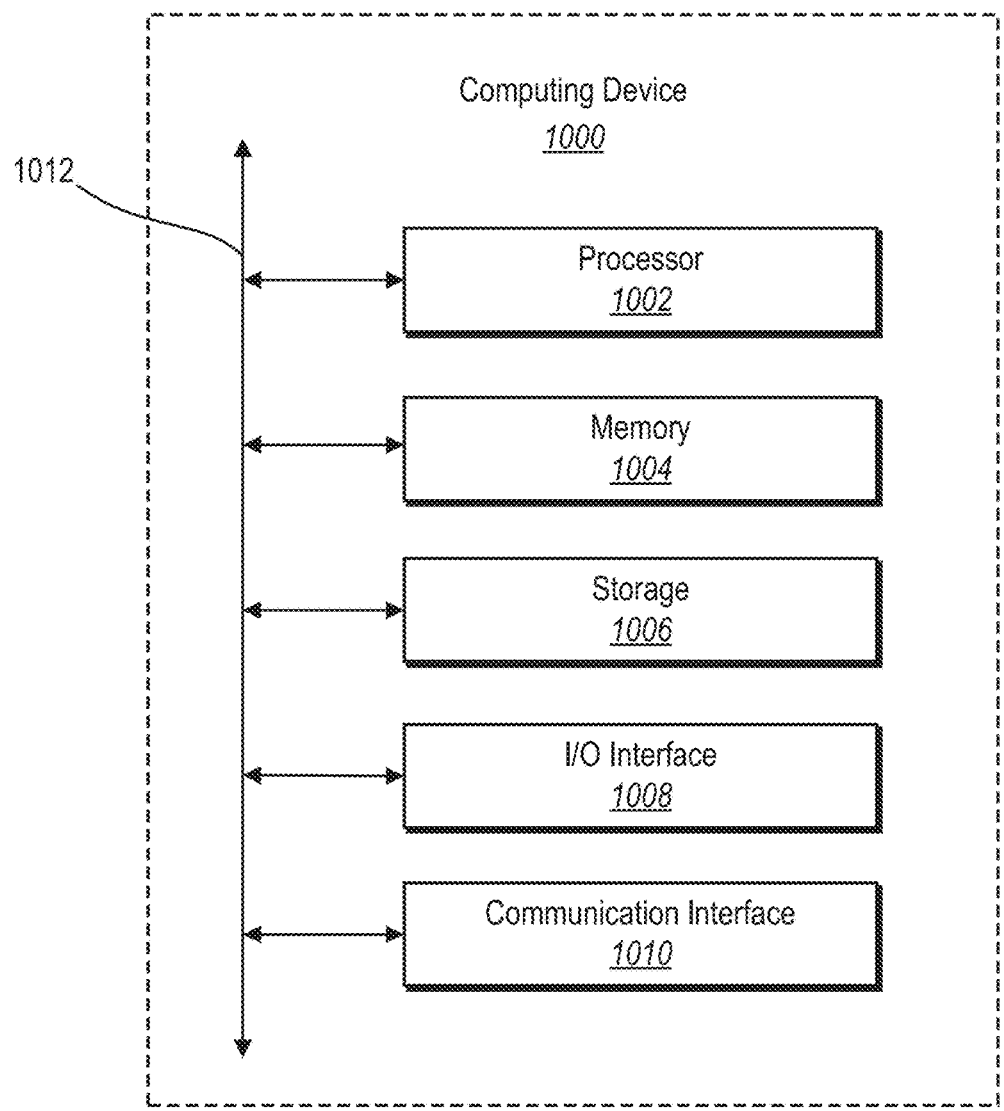
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the client devices 102a-102n, the server(s) 110, the computing device 300, and the second computing device 400 comprise one or more computing devices in accordance with implementations of computing device 1000. As shown by FIG. 10, the computing device can comprise a processor 1002, a memory 1004, a storage device 1006, an I/O interface 1008, and a communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In other embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to:
    provide Unicode emoji image for display via a user interface of a messaging application of a first client device, wherein the Unicode emoji image comprises a Unicode color;
    provide a color modifier control within the user interface;
    receive a user selection of a non-Unicode color via the color modifier control;
    modify the Unicode color of the Unicode emoji image to the non-Unicode color based on receiving the user selection of the non-Unicode color via the color modifier control to generate a customized emoji image by:
        searching text of a vector image file to identify a color code in the text of the vector image file for the emoji image; and
        modifying the color code in the vector image file from the Unicode color to the non-Unicode color; and
    send, by the at least one processor, an indicator of the Unicode emoji image and a non-Unicode color indicator corresponding to the non-Unicode color as part of a digital message from the first client device to a second client device such that the second client device displays the customized emoji image as part of the digital message.

2. The non-transitory computer readable medium of claim 1, further comprising: receiving, at the first client device, an additional digital message, the additional digital message comprising an additional non-Unicode color indicator and an additional Unicode emoji image identifier corresponding to an additional Unicode emoji image on the first client device.

3. The non-transitory computer readable medium of claim 2, further comprising:
    identifying, based on the additional Unicode emoji image identifier in the additional digital message, the additional Unicode emoji image on the first client device, wherein the additional Unicode emoji image comprises an initial color; and
    modifying the initial color of the additional Unicode emoji image on the first client device to a second color based on the non-Unicode color indicator from the additional digital message to generate an additional customized emoji image.

4. The non-transitory computer readable medium of claim 1, further comprising instructions that, when executed by the at least one processor, cause the computing device to provide the Unicode emoji image for display by:
    providing the Unicode emoji image for display as part of a draft digital message within the user interface of the messaging application on the first client device; and
    providing the color modifier control adjacent to the draft digital message.

5. The non-transitory computer readable medium of claim 1, further comprising instructions that, when executed by the at least one processor, cause the computing device to provide the customized emoji image for display within a draft digital message in response to user interaction with the color modifier control.

6. The non-transitory computer readable medium of claim 1, wherein searching the text of the vector image file to identify the color code in the text of the vector image file comprises searching for a color tag and the color code within the text of the vector image file.

7. The non-transitory computer readable medium of claim 1, further comprising instructions that, when executed by the at least one processor, cause the computer device to provide the color modifier control within the user interface in response to determining that the digital message includes the Unicode emoji image.

8. The non-transitory computer readable medium of claim 1, wherein the customized emoji image is not stored on the first client device prior to modifying the Unicode emoji image.

9. A system comprising:
at least one processor; and
at least one non-transitory computer readable storage medium storing instructions that, when executed by the at least one processor, cause the system to:
provide Unicode emoji image for display via a user interface of a messaging application of a first client device, wherein the Unicode emoji image comprises a Unicode color;
provide a color modifier control within the user interface;
receive a user selection of a non-Unicode color via the color modifier control;
modify the Unicode color of the Unicode emoji image to the non-Unicode color based on receiving the user selection of the non-Unicode color via the color modifier control to generate a customized emoji image by:
searching text of a vector image file to identify a color code in the text of the vector image file for the emoji image; and
modifying the color code in the vector image file from the first Unicode color to the non-Unicode color; and
send an indicator of the Unicode emoji image and a non-Unicode color indicator corresponding to the non-Unicode color as part of a digital message from the first client device to a second client device such that the second client device displays the customized emoji image as part of the digital message.

10. The system of claim 9, further comprising instructions that, when executed by the at least one processor, cause the system to:
receive, at the first client device, an additional digital message, the additional digital message comprising an additional non-Unicode color indicator and an additional Unicode emoji image identifier corresponding to an additional Unicode emoji image on the first client device.

11. The system of claim 10, further comprising instructions that, when executed by the at least one processor, cause the system to:
identify, based on the additional Unicode emoji image identifier in the digital message, the Unicode emoji image on the first client device, wherein the Unicode emoji image comprises an initial color; and
modify the initial color of the additional Unicode emoji image on the first client device to a second color based on the additional non-Unicode color indicator from the additional digital message to generate an additional customized emoji image.

12. The system of claim 9, further comprising instructions that, when executed by the at least one processor, cause the system to provide the emoji image for display by:
providing the Unicode emoji image for display as part of a draft digital message within the user interface of the messaging application on the first client device; and
providing the color modifier control adjacent to the draft digital message.

13. The system of claim 9, further comprising instructions that, when executed by the at least one processor, cause the system to provide the customized emoji image for display within a draft digital message in response to user interaction with the color modifier control.

14. The system of claim 9, wherein the customized emoji image is not stored on the first client device prior to modifying the Unicode emoji image.

15. The system of claim 9, wherein the Unicode emoji image corresponds to a plurality of Unicode colors and the color modifier control comprises the Unicode colors and additional colors, the additional colors comprising the non-Unicode color.

16. The system of claim 9, wherein the customized emoji image is not stored on the second client device prior to sending the indicator of the Unicode emoji image and the non-Unicode color indicator corresponding to the non-Unicode color.

17. A non-transitory computer readable medium storing instructions thereon that, when executed by at least one processor, cause a computing device to:
receive, at a recipient client device, a digital message transmitted from a sender client device, wherein the digital message comprises Unicode emoji image identifier corresponding to a Unicode emoji image on the recipient client device and a non-Unicode color indicator;
identify, based on the Unicode emoji image identifier in the digital message, the Unicode emoji image on the recipient client device, wherein the Unicode emoji image comprises a first color;
modify the first color of the Unicode emoji image on the recipient client device to a second color based on the non-Unicode color indicator from the digital message from the sender client device to generate a customized emoji image by:
searching text of a vector image file corresponding to the Unicode emoji image on the recipient client device to identify an existing color code in the text of the vector image file corresponding to the first color; and
replacing the existing color code within the vector image file with a modified color code corresponding to the second color based on the non-Unicode color indicator from the digital message; and
provide the customized emoji image for display as part of the digital message via a user interface of a messaging application on the recipient client device.

18. The non-transitory computer readable medium of claim 17, further comprising instructions that, when executed by the at least one processor, cause the computing device to provide a color modifier control within the user interface.

19. The non-transitory computer readable medium of claim 18, further comprising instructions that, when executed by the at least one processor, cause the computing device to:
provide an additional Unicode emoji image for display via the user interface of the messaging application, wherein the Unicode emoji image comprises a third color; and
in response to a user selection of a fourth color via the color modifier control, modify the additional Unicode emoji image to the fourth color to generate an additional customized emoji image.

20. The non-transitory computer readable medium of claim 19, further comprising instructions that, when executed by the at least one processor, cause the computing device to: send an indicator of the additional Unicode emoji image and an additional non-Unicode color indicator corresponding to the fourth color as part of an additional digital message.

\* \* \* \* \*